United States Patent [19]

Reyes

[11] Patent Number: 4,772,870
[45] Date of Patent: Sep. 20, 1988

[54] POWER LINE COMMUNICATION SYSTEM

[76] Inventor: Ronald R. Reyes, #178—5253 El Cerrito, Riverside, Calif. 92507

[21] Appl. No.: 933,226

[22] Filed: Nov. 20, 1986

[51] Int. Cl.$^4$ ............................................. H04M 11/04
[52] U.S. Cl. .............................. 340/310 R; 340/310 A; 455/124; 358/86; 330/195
[58] Field of Search ........ 340/310 R, 310 A, 310 CP, 340/538; 455/91, 108, 124; 330/188, 306, 256, 195; 358/26; 375/36, 37

[56] References Cited

U.S. PATENT DOCUMENTS

| | | | |
|---|---|---|---|
| 4,066,912 | 1/1978 | Wetherell | 340/310 R |
| 4,321,581 | 3/1982 | Tappeiner et al. | 340/310 R |
| 4,538,136 | 8/1985 | Drabing | 340/310 R |

Primary Examiner—Donnie L. Crosland
Attorney, Agent, or Firm—Majestic, Gallagher, Parsons & Siebert

[57] ABSTRACT

A low-level, low-power radio frequency (RF) communications system designed to operate as a point-to-point power line communications system (PLC) utilizing frequencies from 50 to 600 MegaHertz (MHz) superimposed onto the AC power signal in a building.

10 Claims, 4 Drawing Sheets

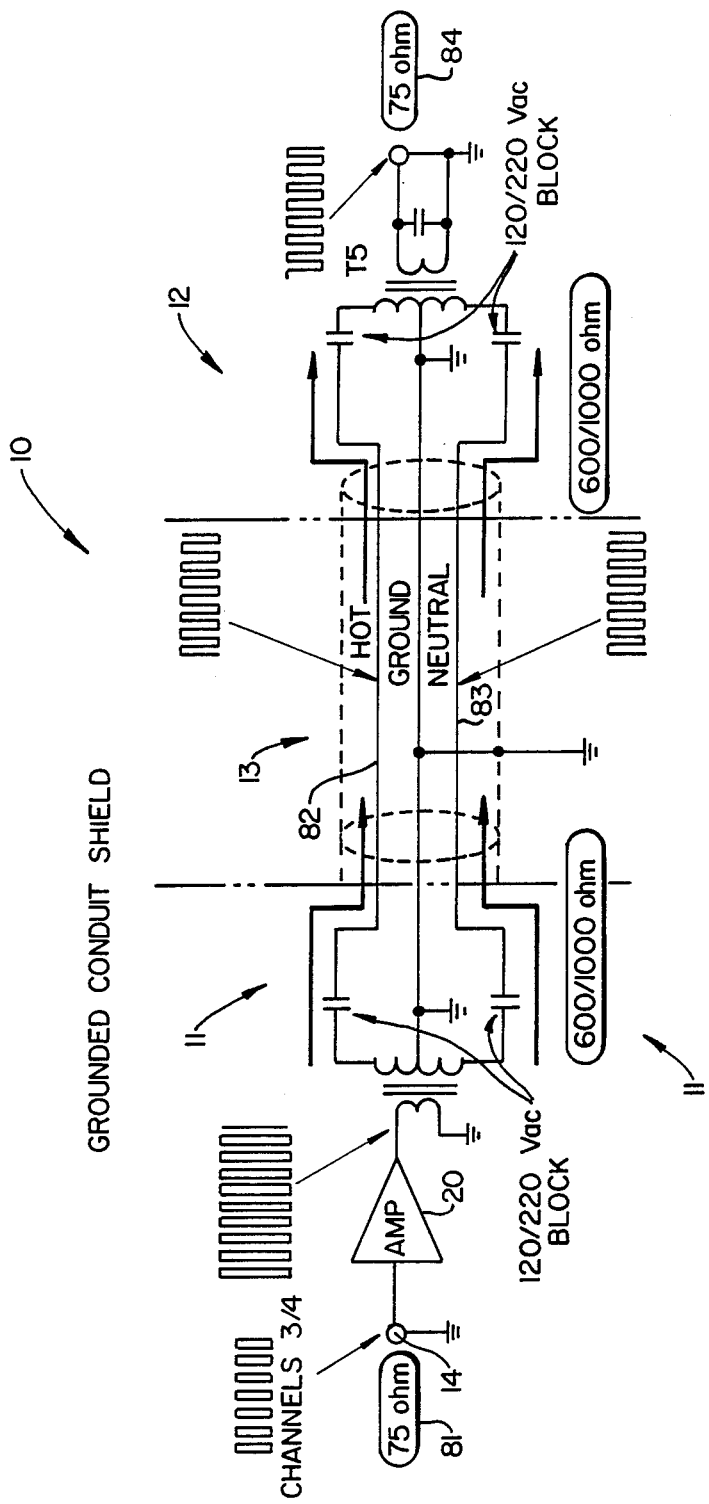
FIG._1.

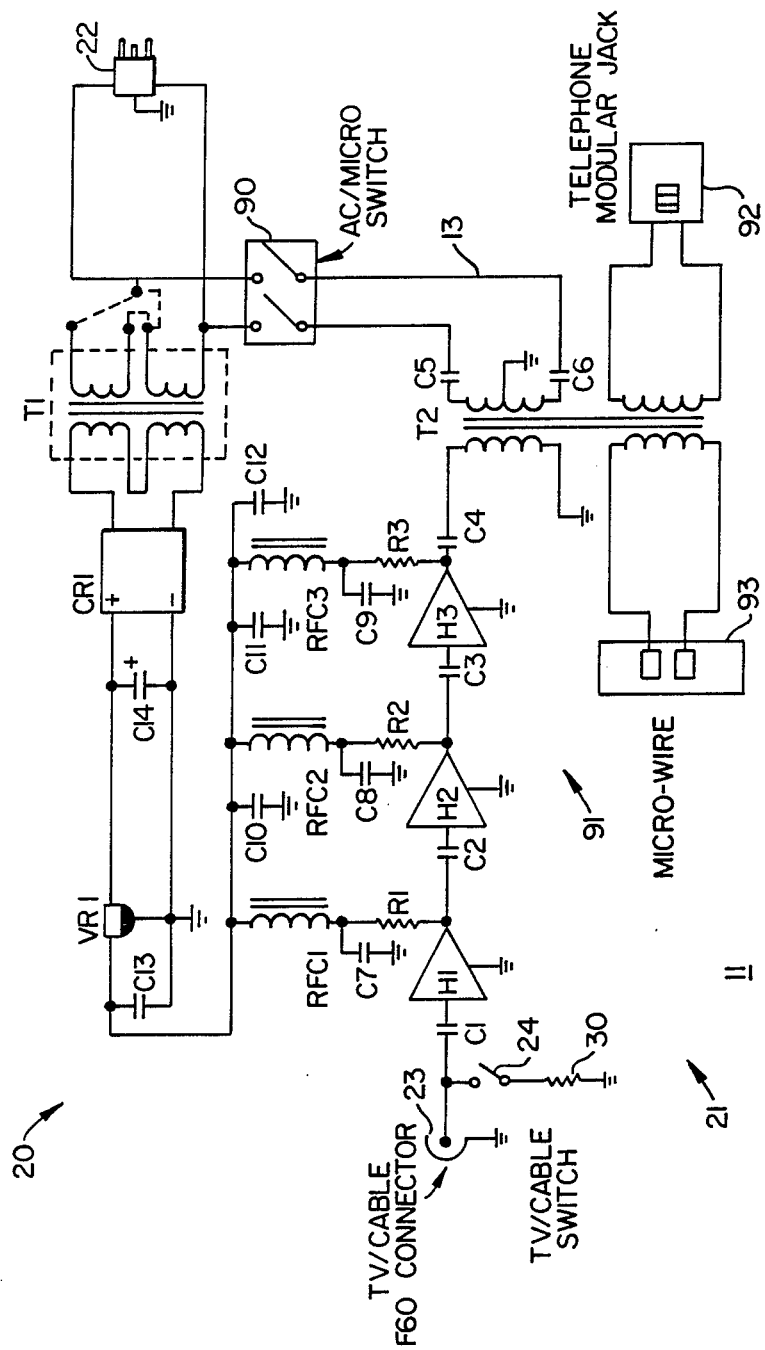
FIG._2.

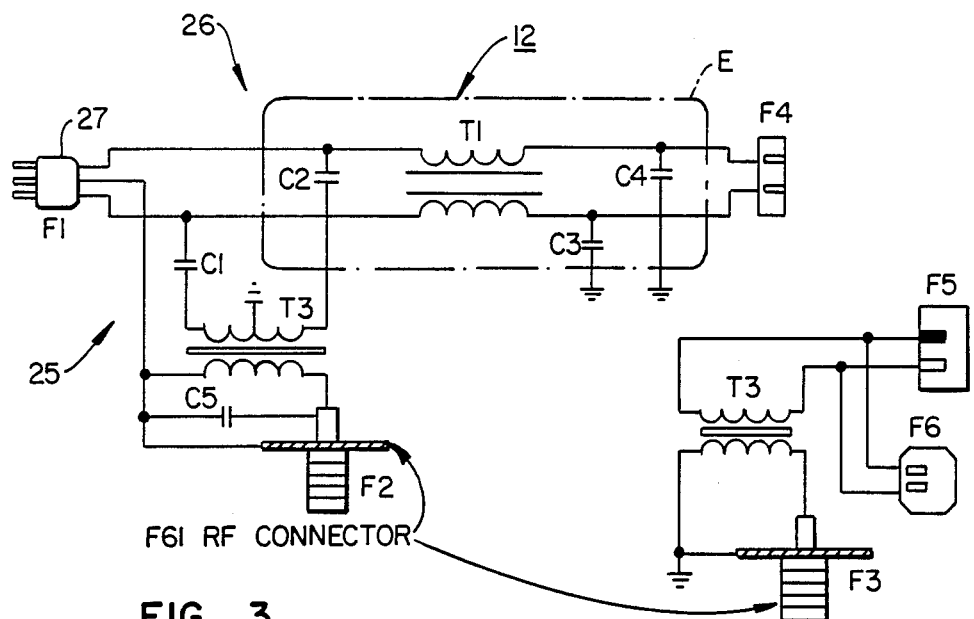
FIG._3.
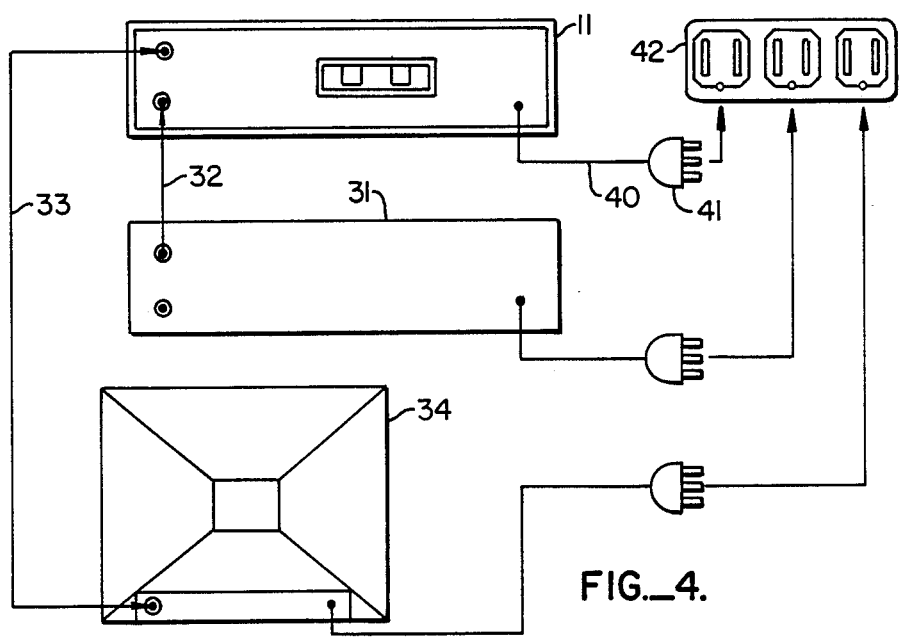
FIG._4.

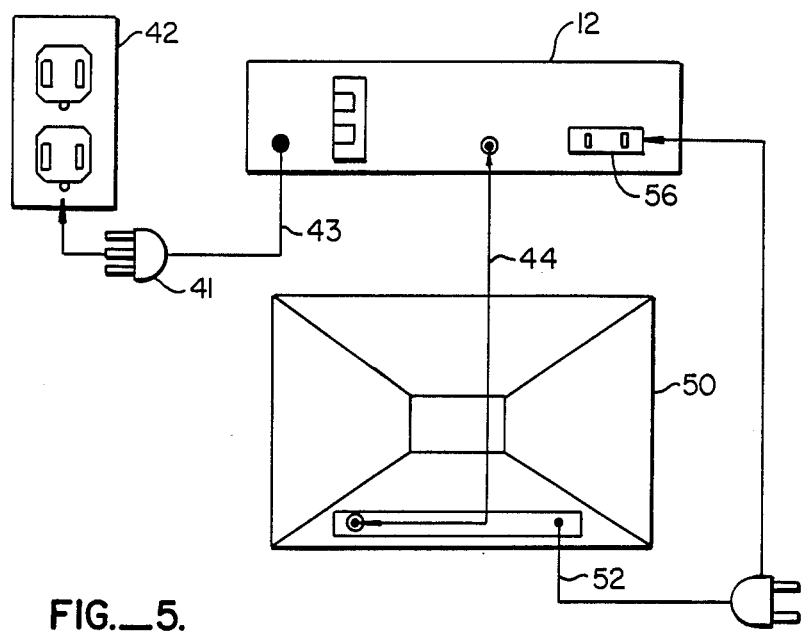
FIG._5.
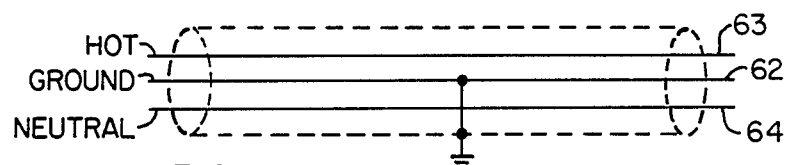
FIG._6A.
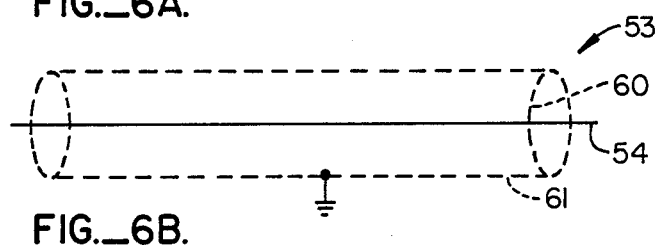
FIG._6B.
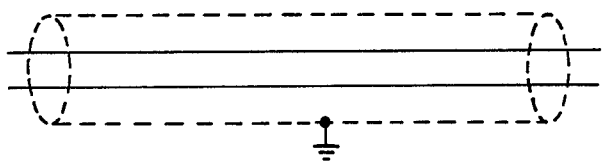
FIG._6C.

POWER LINE COMMUNICATION SYSTEM

INTRODUCTION

This invention relates to a low level, low power radio frequency communications system and, more particularly, to a point-to-point power line communications system ("PLC") utilizing the AC power signal with a superimposed 50–600 MHz signal.

BACKGROUND OF THE INVENTION

A power line communication system ("PLC") typically operates by superimposing a modulated carrier frequency on the AC signal carried on a power line. A basic PLC system consists of a transmitter unit capable of adding the communication signal to the AC power line signal and a receiver unit capable of separating the communication signal from the AC power component signal.

In an ideal PLC system, the output signal of the receiver is a perfect copy of the signal which was introduced to the transmitter. That is, any signals (i.e., noise) which may impinge upon the system from a source other than the transmitter are ignored by the receiver. The ideal PLC system should furthermore not become a source of noise either through direct transmission or by radiation.

In previous circuits, PLC systems has been used for relatively low carrier frequencies of 160 Kilohertz (KHz) to 455 Kilohertz (KHz). Some may utilize a frequency as high as 1.5 Megahertz (MHz).

The AC power line may broadcast the communication signal. This creates noise which may interfere with other communication signals. If the communication signal strength is too low, the signal will be overpowered by the level of noise on the line. If the communication signal is strong and is a very high frequency, the power line may begin to radiate and thus violate government regulations regarding interference and harmful radiation levels.

SUMMARY OF THE INVENTION

According to the present invention, there is disclosed a circuit for power wiring transmission of a very high frequency signal comprising a transmitter to superimpose the signal on a power line, a receiver to receive the very high frequency signal on the power line and to separate said very high frequency signal from the power component of the signal, and to provide said very high frequency signal as an output signal, said transmitter including a multi-stage amplifier, the final stage of said multi-stage amplifier being a highly stable overrated hybrid amplifier with a wideband frequency response.

BRIEF DESCRIPTION OF THE SEVERAL VIEWS OF THE DRAWINGS

A specific embodiment of the invention will now be described by way of example only with the use of drawings in which:

FIG. 1 is a block diagram of the power line communications circuit according to the invention illustrating the transmitter, the AC power line and the receiver;

FIG. 2 is a schematic diagram of the transmitter of FIG. 1;

FIG. 3 is a schematic diagram of the receiver of FIG. 1;

FIG. 4 is a wiring hook-up diagram used for the transmitter;

FIG. 5 is a wiring hook-up diagram used for the receiver; and

FIGS. 6A, 6B and 6C illustrate a coaxial cable used as an AC power line, a coaxial cable used by the cable television industry, and a triax cable, respectively.

DESCRIPTION OF SPECIFIC EMBODIMENT

With reference to the drawings, the PLC system is illustrated generally at 10 in FIG. 1. It comprises a transmitter section generally illustrated at 11, a receiver section generally illustrated at 12 and an AC power line generally illustrated at 13. The signal enters the amplifier 20 at point 14 and is then passed to the AC power line 13 as will be more clearly described hereafter. The amplifier 20 in FIG. 1 is more clearly detailed in the schematic diagram of the transmitter 11 as shown in FIG. 2.

The transmitter 11 (FIG. 2) comprises two sections generally illustrated at 20, 21. The upper section 20 is a power supply comprising a three wire AC power plug and cord 22, a 12 volt step-down transformer T1, a full wave rectifier element CR1, a voltage regulator device VR1 and several filtering capacitors C10, C11, C12, C13 and C14.

The lower section 21 of the transmitter 11 is the signal processing section comprising an F60 cable connector 23, a switch 24, a 100 ohm pull-down resistor 30 and three MWA 110 hybrid amplifiers H1, H2, H3 coupled together through 0.001 microfarad capacitors C1, C2, C3, C4. Inductors RFC1, RFC2 and RFC3 are each made from one turn of #26 enameled copper wire on a ferrite bead with each inductor connected to the output of its respective amplifier through a 560 ohm resistor R1, R2, R3, respectively, and filtered to ground through a 0.001 microfarad capacitor C1, C2, C3, respectively.

The output of the final amplifier H3 is connected through its coupling capacitor C4 to a toroidal transformer T2 made from 12 turns of enameled #26 copper wire on the primary and twelve turns centre tapped on the secondary. The output of the transformer T2 is coupled to the hot and neutral lines of the AC power line through 0.0047 microfarad capacitors C5, C6 with the center tap of the transformer T2 tied to ground.

The receiver 12 also comprises two sections, an AC power line matching circuit 25 and the AC power line RFI/EMI filter 26 to the television receiver AC cord. The AC power line matching circuit 25 is comprised of a three wire AC power plug 27, 0.0015 microfarad capacitors C1, C2 in line with the hot and neutral lines of the AC power line and the primary of toroidal transformer T3. The T3 primary is comprised of 12 turns #26 copper enamel wire. The T3 secondary is connected to an F61 RF connector F2 with a parallel 10 picofarad compacitor C5.

The RFI/EMI filter section 26 of the receiver 12 is comprised of two windings on a single toroid T1 in line with the hot and neutral power lines respectively. The other ends of the windings are connected to 0.0015 microfarad capacitors C3, C4 grounded, respectively and polarized AC power receptacle F4 which is the AC power outlet to the television.

The circuit components in the receiver section are passive to avoid unnecessary noise.

Referring now to FIG. 4, the transmitter 11 is attached to a video cassette recorder ("VCR") 31 used as the RF source and a nearby television 34. The cable 32 connecting the VCR 31 to the transmitter 11 and the cable 33 connecting the transmitter 11 to the television 34 are standard coax cables as will be described hereafter.

A three wire power cord 40 extends from the transmitter 11 to the plug 41 and into outlet 42 where it is connected to the AC wiring system of the building.

With reference to FIG. 5, the AC power along with the superimposed RF signal enters the receiver 12 by plug 41 from outlet 42 and three wire power cord 43.

A 75 ohm coax cable 44 runs from the receiver 12 to the television 50 to carry the RF signal. An auxiliary power outlet on the receiver 12 supplies power to the television 50 by cable 52 and polarized receptacle 56.

OPERATION

It will initially be assumed that the source of the RF signal originates in a video cassette recorder ("VCR") with the destination of the signal being a standard television, although the source may be any RF source of 50 to 600 MHz and the destination may be any component capable of interpreting the signal. Similarly, the RF signal is assumed to be a channel 3 signal, which is a standard output for VCRs in North America although any channel within the aforementioned frequency range can be utilized.

Referring to FIG. 6B the coax cable generally illustrated at 53 comprises a centrally located conductor 54 typically insulated by a teflon layer 60 and shielded by a woven conductive ground layer 61 and a protective plastic coating (not shown). The AC power distribution line of FIG. 6A includes a grounded conduit 62 which functions as a shield to the two active conductors in the AC line 63, 64 which are the hot and neutral conductors, respectively. The dielectric between the lines 63, 64 inside the conduit 62 is a plastic insulation (not shown) while the dielectric between the inside conductors and the conduit shield is air unlike the teflon insulation used in coax or triax.

The transmitter 11 illustrated in FIG. 4 is attached to a VCR 31 as the RF source and a nearby television 34. The cables 32, 33 connecting the VCR to the transmitter and the transmitter 11 to the television 34, respectively, are standard coax. The signal enters the transmitter 11 from the VCR on cable 32 and may bypass the internal circuitry of the transmitter to carry on to the nearby television when they are directly connected by cable 33. When the signal is to be passed to the AC power line, it is modified in the transmitter 11 as will be described and is subsequently carried upon the AC power line (not shown) after leaving the transmitter 11 via the three wire AC power cord 40. The signal thereby enters the AC wiring system 13 (FIG. 1) of the building.

Referring to FIG. 5, the AC power along with the superimposed RF signal enters the receiver 12 by way of the AC outlet 42 and three wire power cord 43. The receiver 12 separates the RF signal from the AC power component as will be described hereafter which is made available to the RF receiver 51 by way of an RG-59 shielded cable with F61 type RF connectors. The auxiliary power outlet on the receiver 50 is filtered and intended to supply power to the television 50 for reasons explained hereafter.

The path of the RF signal from the transmitter 11 to the receiver 12 is illustrated in FIG. 1. The RF signal enters the transmitter section 11 as a channel 3 on a 75 ohm coax cable 81. The RF signal passes through amplifier 20 and is coupled to the hot and neutral lines 82, 83 respectively of the AC line 13. The superimposed RF signal is carried down the AC power line 13 to a second center tapped transformer T5 inside the receiver 12 so its output as from the receiver 12 is a channel 3 on a 75 ohm coaxial cable 84 where it can be utilized by the television 50.

A schematic of the transmitter 11 is illustrated in FIG. 2. The conventional three wire power cord 22 functions as both power source to the transmitter 11 and as point of entry for the superimposed RF signal into the AC wiring system of the building. The AC switch 90 turns the transmitter 11 on and off by controlling the power. A step-down transformer T1 within the power supply section 20 of the transmitter 11 converts the AC power voltage to 12 volts AC. This signal is then passed through the full wave rectifier CR1 and a +5 volt regulator VR1 to provide a +5 volt power signal to the transmitter circuitry. The power signal is filtered with capacitors C10 through C14. A number of other discrete components are illustrated to provide the necessary bias voltages to the amplifiers.

The amplifier generally illustrated at 91 in the transmitter 11 is a three stage wideband amplifier with an approximate 32 dB gain operable at frequencies of 50 to 600 MHz. Each stage has a 12 dB gain and draws approximately 10 milliamps at 3 volts from the power signal. The first two stages H1, H2 are less important than the third stage H3 which is a hybrid highly stable overrated amplifier with a wideband frequency response.

The first stage H1 is a preamplifier which raises the 78 millivolt level of the VCR 31 which is the RF source. The second stage H2 drives the final hybrid stage H3 which loads the transmission line 13. The signal at the secondary of the center-tapped toroidal transformer T2 is about 100 millivolts. The final stage H3, however, should have the characteristics to pass a full 1 volt peak-to-peak signal through the AC power distribution line 13 although such a signal is never actually transmitted. Thus, an overrated amplifier is required. Each stage of the amplifier 91 is capacitor coupled by capacitors C1, C2, C3, C4. If the cascade three stage amplifier 91 was not so overrated, the line impedance differences from outlet to outlet would affect the impedance matching characteristics of the amplifier line matching network and the signal levels in the power distribution would change. By overrating the power output of the amplifier 91, the signal output level is less affected. Using gains of this amplifier, the interstages would normally lose stability and begin to oscillate and be noticeably affected by temperature.

The output from the amplifier section 91 is connected to the AC line 13 via a matching network of a single toroidal transformer T2 with its primary tuned to the output of the last stage H3 of the amplifier 91. The output of the amplifier H3 and the primary of the transformer T2 are at a frequency of 54 MHz to set the voltage standing wave ratio (VSWR) to approximately 2:1 or worse. A telephone modular jack and micro wire connector 92, 93, respectively, are also illustrated. There are alternate methods of introducing signals to the television.

The receiver 12 is illustrated more specifically in FIG. 3. It contains no active components so that noise is reduced. The toroidal line matching transformer T3 has its primary matched to the AC power distribution line impedance and its secondary is connected to a coaxial cable connector F2. The primary is also center tapped to effectively use both the hot and neutral sides of the AC line. The secondary of the transformer T3 is then tuned to match the 75 ohm antenna input 82 of the RF receiver at 60 to 75 MHz.

The receiver 12 further consists of a low pass radio frequency interference RFI filter E which rejects all frequencies from 50 MHZ and up to well below 55 dB. The purpose of the filter E is to avoid any signal that might pass through the television receiver AC cord into the television chassis and produce an unwanted signal along with the desired signal at the antenna input of the television of the receiver. The AC line to the television is polarized as earlier stated in order for the AC requirements of the television to be maintained and to avoid an unwanted RF signal passing through to the television chassis while the same signal arrives at the antenna input to the television whereas the two frequencies would compete for selection causing harmonics and a beat signal which appear on the screen as lines, watering effects and various other visual phenomena.

The superimposed RF signal will not jump transformers or power meters and therefore these loads are considered terminations to the RF transmission line. These loads provide a large impedance to the AC line at these frequencies which is considered to be infinite and open.

It is also contemplated that the transmission medium for the transmitter signal could be a telephone line or simply a pair of actual wires extending between the transmitter and the receiver. For example and with reference to FIG. 3, the alternative transmission line circuitry of FIG. 3 is comprised of a toroidal transformer T6, push connector F5, modular telephone jack F6 and F61 RF connector F3. The windings of the alternate transmission connector F5, F6 is comprised of 4 turns #26 copper enamel wire and winding of F3 is two turns of #26 copper wire. In this event, the apparatus illustrated generally at 93 and 92 in FIG. 2 could be added to the circuit by way of a transformer which could be integral with the transformer T2.

The on-off switch 90 (FIG. 2) could be deleted if necessary but it is inconvenient and inefficient to leave the transmitter 11 powered when it is unnecessary to do so.

The apparatus disclosed results in power line radiation of less than 15 microvolts per meter when the area of the power transmission network is less than 1500 square feet.

Regardless of whether or not the power signal is 110 or 220 voltage AC signal, the apparatus according to the invention will function in the desired manner. The apparatus will further function as intended regardless of whether the format is NTSC, PAL or SCAM, PAL and SCAM being international formats.

While a specific embodiment according to the invention has been disclosed, such embodiment should be taken as illustrative of the invention only and not as limiting its scope which should be construed in accordance with the accompanying claims.

I claim:

1. A circuit for power wiring transmission of a very high frequency signal comprising a transmitter to superimpose the signal on a power line, a receiver to receive the very high frequency signal on the power line and to separate said very high frequency signal from the power component of the signal, and to provide said very high frequency signal as an output signal, said transmitter including a multi-stage amplifier, the final stage of said multi-stage amplifier being a highly stable overrated hybrid amplifier with a wideband frequency response.

2. A circuit as in claim 1 wherein said highly stable overrated hybrid amplifier is the final stage of a multi-stage amplifier circuit.

3. A circuit as in claim 2 wherein said power line is a three wire power line, the first of said wires being hot, the second of said wires being neutral, and the third of said wires being ground connected.

4. A circuit as in claim 3 wherein said very high frequency signal is carried on the neutral and hot lines of said three wire power line.

5. A circuit as in claim 3 wherein said radio frequency radiation radiated by said power line is less than 15 microvolts per meter.

6. A circuit as in claim 5 wherein said multi-stage amplifier is a three stage cascade type amplifier.

7. A circuit as in claim 1 wherein said receiver includes a low pass AC line RFI/EMI filter.

8. A circuit as in claim 7 wherein said receiver further includes a line matching transformer network.

9. A circuit as in claim 8 wherein said power line connections are three wire and grounded.

10. A circuit as in claim 1 wherein said receiver comprises passive circuitry and components.

* * * * *